(12) United States Patent
Garner

(10) Patent No.: US 8,406,690 B2
(45) Date of Patent: Mar. 26, 2013

(54) DATA TRANSMISSION SYSTEM

(75) Inventor: Stephen Granville Garner, Leicestershire (GB)

(73) Assignee: Rolls-Royce PLC (GB)

( * ) Notice: Subject to any disclaimer, the term of this patent is extended or adjusted under 35 U.S.C. 154(b) by 136 days.

(21) Appl. No.: 13/108,341

(22) Filed: May 16, 2011

(65) Prior Publication Data

US 2011/0294427 A1    Dec. 1, 2011

(30) Foreign Application Priority Data

May 27, 2010  (GB) .................................. 1008880.5

(51) Int. Cl.
*H04B 7/00* (2006.01)
(52) U.S. Cl. .................. 455/41.2; 455/90.3; 340/572.1; 340/870.31; 340/870.01; 340/539.26; 73/514.01; 73/147; 416/61
(58) Field of Classification Search ............... 455/41.2, 455/90.3; 340/572.1, 870.31, 870.01, 539.26; 73/514.01, 147; 416/61
See application file for complete search history.

(56) References Cited

U.S. PATENT DOCUMENTS

| | | | |
|---|---|---|---|
| 2004/0113790 A1* | 6/2004 | Hamel et al. ............... | 340/572.1 |
| 2009/0121896 A1* | 5/2009 | Mitchell et al. .......... | 340/870.31 |
| 2009/0277266 A1* | 11/2009 | Wang et al. ................ | 73/514.01 |

FOREIGN PATENT DOCUMENTS

| | | |
|---|---|---|
| DE | 4328600 A1 | 3/1995 |
| DE | 102005016961 A1 | 10/2006 |
| GB | 2172708 A | 9/1986 |
| JP | 2004135154 A | 4/2004 |
| JP | 2006092355 A | 4/2006 |

\* cited by examiner

*Primary Examiner* — April G Gonzales
(74) *Attorney, Agent, or Firm* — McCormick, Paulding & Huber LLP

(57) ABSTRACT

A system is provided for transmitting data between a first component and a second component, which rotates relative to the first component. The system includes a first coupling element of limited angular extent mounted to the first component, and a second coupling element of limited angular extent mounted to the second component. The first and second coupling elements come into angular alignment once per revolution of the second component relative to the first component. The system further includes a first transceiver connected to the first coupling element, and a second transceiver connected to the second coupling element. The first and second transceivers are configured to detect the angular alignment of the first and second coupling elements. The first and second transceivers are further configured to transmit data between the first and second transceivers via the first and second coupling elements when the angular alignment is detected.

12 Claims, 3 Drawing Sheets

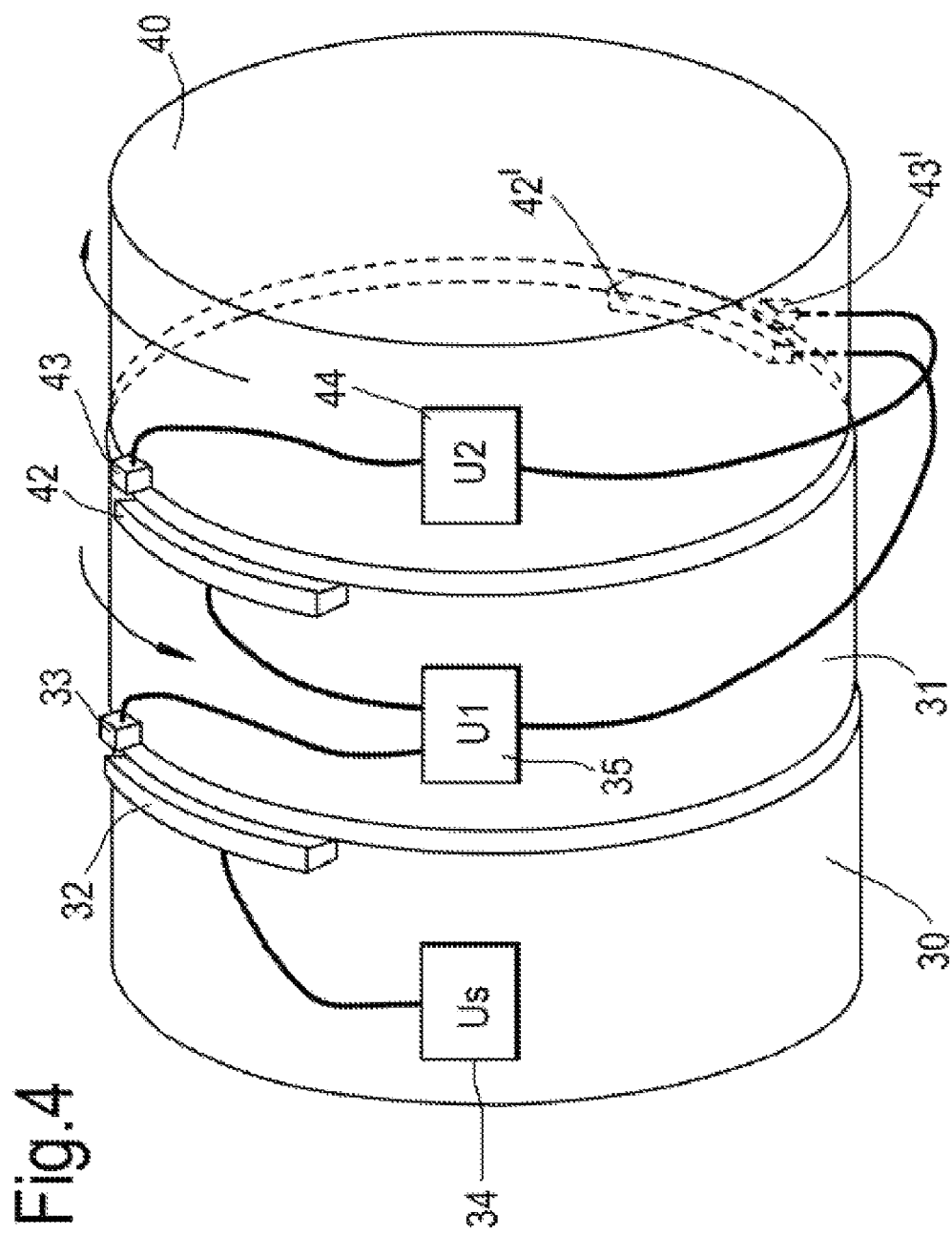

DATA TRANSMISSION SYSTEM

CROSS REFERENCE TO RELATED APPLICATION

This application is entitled to the benefit of British Patent Application No. GB1008880.5, filed on May 27, 2010.

FIELD OF THE INVENTION

The present invention relates to a system for transmitting data between a first component, such as an engine casing, and a second component, such as a propeller hub, which rotates relative to the first component.

BACKGROUND OF THE INVENTION

In complex rotating machines, such as gas turbine engines, it is often desirable or necessary to send data across rotating interfaces. For example, in a turboprop engine, measurement data from an instrumentation package on a rotating propeller hub may need to be sent to a central processor or memory device mounted on the static engine casing. Likewise, command data may need to be sent from a command unit mounted on the static engine casing to drive actions (such as measurements) by devices on the propeller hub.

Although in principal it may be possible to transmit such data using radio techniques, in practice a physically closed transmission route may be desirable, for example to improve immunity from interference or because radio signals may interfere with engine or aircraft operation.

Thus conventional mechanisms for transferring data between rotating and static components use 360° devices such as slip rings or induction couplings that maintain continuous coupling, and hence a continuous communication channel, between the data transmitter and receiver.

The reliability and performance of such continuous couplings is generally improved by mounting the couplings close to the axis of rotation, where the relative velocity across the rotating interface is lower. Also, the weight and size of continuous couplings can be reduced by mounting close to the axis. Thus, for example, in gas turbine engines it might be desirable to mount a continuous coupling surrounding a drive shaft. However, it is often not practical to mount such a coupling close to the axis of rotation, e.g. due to a lack of easy access to the centre of the engine which can compromise reliability and/or maintainability.

SUMMARY OF THE INVENTION

Thus it would be desirable to provide a system for transmitting data across a rotating interface that can be mounted at relatively large distances from the axis of rotation, yet which does not impose a significant weight or installation burden.

Accordingly, in a first aspect, the present invention provides a system for transmitting data between a first component and a second component which rotates relative to the first component, the system including:

a first coupling element of limited angular extent mounted to the first component, and a second coupling element of limited angular extent mounted to the second component, the first and second coupling elements coming into angular alignment once per revolution of the second component relative to the first component, and a first transceiver connected to the first coupling element, and a second transceiver connected to the second coupling element, wherein the first and second transceivers are configured to detect the angular alignment of the first and second coupling elements, and are further configured to transmit data between the first and second transceivers via the first and second coupling elements when the angular alignment is detected.

The first and second coupling elements, being of limited angular extent, do not extend a full 360° around the axis of rotation. Thus the couplings can be relatively easy to install, and the imposition of significant additional mass particularly on rotating components can be avoided. Further, adoption of appropriate communication protocols between the transceivers can overcome the difficulty that the coupling elements are only intermittently (i.e. once per revolution) in angular alignment.

The system of the first aspect may have any one or any combination of the following optional features.

Data can be transmitted from one transceiver to the other via the coupling elements only when the angular alignment is detected. The first and second transceivers may be mounted to their respective components.

Conveniently, the first and second coupling elements can be inductive elements, which magnetically couple with each other when angularly aligned.

The first and second transceivers may be electrically connected to respectively the first and second coupling elements.

The first and second transceivers may include respective memory elements for temporary storage of data pending transmission of the data from one transceiver to the other via the coupling elements when the angular alignment is detected. The memory elements can act, therefore, as data buffers during the periods of coupling elements non-alignment.

One of the transceivers is a master transceiver and the other is a slave transceiver, the master transceiver repeatedly driving its respective coupling element with a call signal, and the slave transceiver monitoring its respective coupling element for receipt of the call signal, whereby data is transmitted between the transceivers after the slave transceiver receives the call signal. The master/slave arrangement can help to ensure that when one of the transceivers is transmitting the other transceiver is ready to receive and vice versa.

The master transceiver may drive its respective coupling element after each repeat of the call signal with master data, whereby, after the slave transceiver receives the call signal, the slave transceiver receives the master data. For example, the master transceiver may repeatedly drive its coupling with the call signal followed by the same master data until alignment occurs and that data is transmitted.

The master transceiver may drive its respective coupling element after each repeat of the call signal with a timing signal indicating when the slave transceiver can transmit data to the master transceiver, whereby the slave transceiver drives its respective coupling element with slave data at the time indicated by the timing signal, and the slave data is received by the master transceiver. The slave data can be real data, or simply an indication that master data has been received by the slave transceiver, whereupon the master transceiver can stop transmission of that particular master data.

The system may further include:

one or more additional first coupling elements of limited angular extent mounted to the first component, and respective additional second coupling elements of limited angular extent mounted to the second component, each pair of an additional first angular element and a corresponding second additional angular element coming into angular alignment once per revolution of the second component relative to the first component, wherein the first transceiver is also connected to the additional first coupling elements, and the second transceiver is also connected to the additional second coupling elements, wherein the first and second transceivers are configured to detect the respective angular alignments of the pairs of first and second additional coupling elements, and are further configured to transmit data between the first and second transceivers via the first and second additional coupling elements when the angular alignments are detected.

The additional first coupling elements provide alternative data transmission channels and can therefore increase redundancy in the system. In this way, if any one coupling element ceases to function correctly, data may still be transmitted between the components over the other data transmission channels.

Optional features described above with reference to the first and second coupling elements and their respective transceivers apply also to the additional first and second coupling elements and their respective transceivers.

The system may also transmit data between the second component and a third component which rotates relative to the second component. Thus, the system may further include:

a third coupling element of limited angular extent mounted to the third component, and a fourth coupling element of limited angular extent mounted to the second component, the third and fourth angular elements coming into angular alignment once per revolution of the third component relative to the second component, and a third transceiver connected to the third coupling element, wherein the second transceiver is also connected to the fourth coupling element, and the third and second transceivers are configured to detect the angular alignment of the third and fourth coupling elements, and the third and second transceivers are further configured to transmit data between the third and second transceivers via the third and fourth coupling elements when the angular alignment of the third and fourth coupling elements is detected.

Thus, the second transceiver can act as a relay station, allowing data to be transmitted from the first component to the third component, or vice versa.

Optional features described above with reference to the first and second coupling elements and their respective transceivers apply also to the third and fourth coupling elements and their respective transceivers.

A second aspect of the invention provides a rotating machine having a first component and a second component which rotates relative to the first component, the machine further having a system according to the first aspect for transmitting data between the first component and the second component.

For example, the rotating machine can be a gas turbine engine particularly an aero engine, such as a turboprop engine, the first component being an engine casing, and the second component being a propeller hub.

A third aspect of the invention provides a rotating machine having a first component, a second component which rotates relative to the first component, and a third component which rotates relative to the second component, the machine further having a system according to the first aspect for transmitting data between the first component and the second component, and for transmitting data between the second component and the third component.

The second and the third components may contra-rotate relative to each other. For example, the rotating machine can be an aero engine, such as contra-rotating propeller gas turbine engine, the first component being an engine casing, the second component being a first propeller hub, and the third component being a contra-rotating second propeller hub.

BRIEF DESCRIPTION OF THE DRAWINGS

FIG. 4 shows schematically a first, a second and a third component which rotate relative to each other about a rotation axis, the components having a further system for transmitting data across their rotating interfaces.

DETAILED DESCRIPTION OF THE PREFERRED EMBODIMENTS

Figure 1:
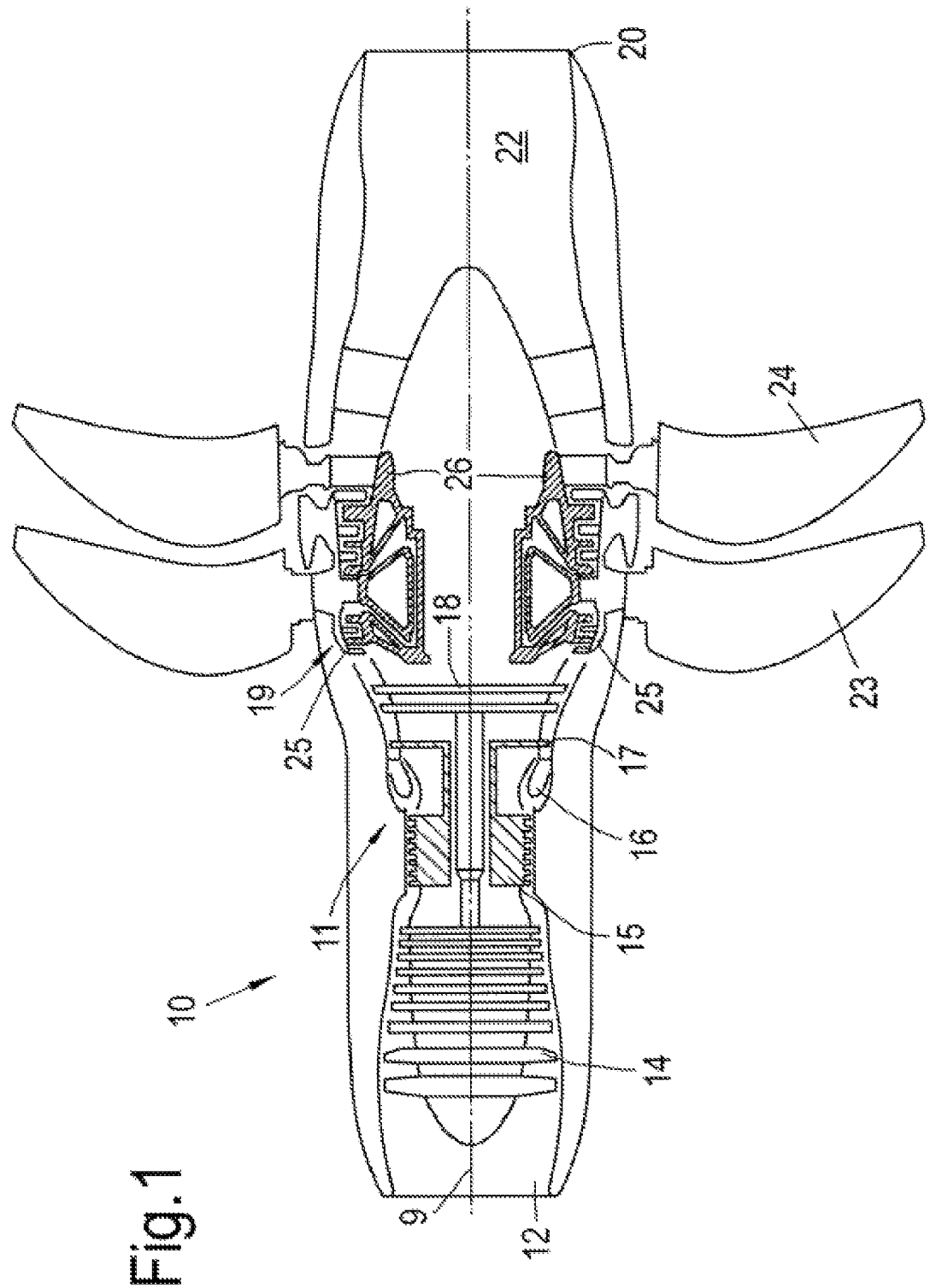
FIG. 1 shows a schematic longitudinal cross-section of a twin-spooled, contra-rotating propeller gas turbine engine.

Referring to FIG. 1, a twin-spooled, contra-rotating propeller gas turbine engine is generally indicated at 10 and has a principal and rotational axis 9. The engine 10 comprises a core engine 11 having, in axial flow series, an air intake 12, an intermediate pressure compressor 14 (IPC), a high-pressure compressor 15 (HPC), combustion equipment 16, a high-pressure turbine 17 (HPT), low pressure turbine 18 (IPT), a free power turbine 19 (LPT) and a core exhaust nozzle 20. A nacelle 21 generally surrounds the core engine 11 and defines the intake 12 and nozzle 20 and a core exhaust duct 22. The engine 10 also comprises two contra-rotating propellers 23, 24 attached to and driven by the free power turbine 19, which comprises contra-rotating blade arrays 25, 26.

The gas turbine engine 10 works in a conventional manner so that air entering the intake 13 is accelerated and compressed by the IPC 14 and directed into the HPC 15 where further compression takes place. The compressed air exhausted from the HPC 15 is directed into the combustion equipment 16 where it is mixed with fuel and the mixture combusted. The resultant hot combustion products then expand through, and thereby drive the high, low-pressure and free power turbines 17, 18, 19 before being exhausted through the nozzle 20 to provide some propulsive thrust. The high, low-pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust.

The contra-rotating blade arrays 25, 26 rotate in opposite directions, and hence a rotating interface is formed therebetween. Likewise, a rotating interface is formed between the static structure surrounding and supporting the core engine 11 and the forward blade array 25. Respective instrumentation packages (not shown) are installed on the blade arrays 25, 26, and these packages need to communicate with a control unit located on the engine static structure.

Figure 2:
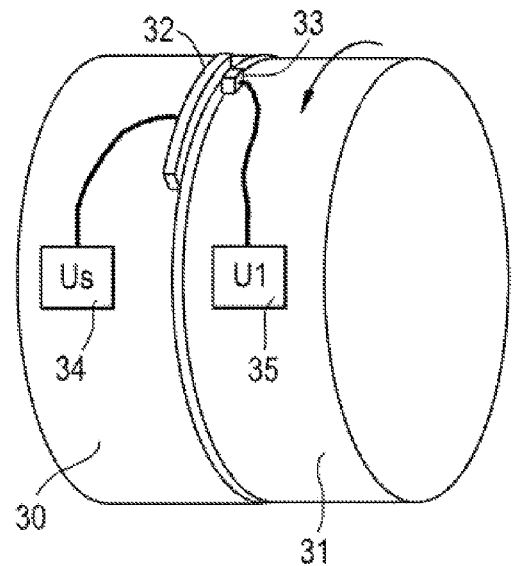
FIG. 2 shows schematically a first and a second component which rotate relative to each other about a rotation axis, the components having a system for transmitting data across their rotating interface.

FIG. 2 shows schematically an arrangement in which a first 30 and a second 31 component rotate relative to each other about a rotation axis. In the context of the engine 10 of FIG. 1, the first component could be the static engine structure and the second component could be the forward blade array 25. The arrangement includes a system for transmitting data across the rotating interface between the components. The system comprises a first inductive coupling element 32 mounted to the first component and a second inductive coupling element 33 mounted to the second component. The coupling elements are both of limited angular extent, although the first coupling element extends significantly further in the circumferential direction than the second coupling element. Once per revolution of the second component relative to the first component, the coupling elements come into angular alignment and face each other across the rotating interface between the two components. The coupling elements are thus magnetically coupled for only a limited period during each revolution. The coupling elements are mounted at a convenient diameter relative to axis of rotation, enabling easy access for installation and maintenance. The limited circumferential extent of the coupling elements produces substantial weight savings and facilitates ease of installation compared to conventional systems requiring a full 360° of coupling.

The system also includes a first transceiver device 34 mounted to the first component 30 and a second transceiver device 35 mounted to the second component 31. The transceiver devices are electrically connected to the respective inductive coupling elements 32, 33 and cause data transfer between the two inductive coupling elements during the periods of magnetic coupling. The transceiver devices also include respective memory elements for temporary storage of data destined for transfer pending suitable alignment of the coupling elements. The transceiver devices operate a suitable protocol for detecting the alignment of the inductive elements in order to allow data to be transferred during the alignment periods. The angular extent of the longer first coupling element 32 effectively determines the ratio between periods of alignment (when data transfer is possible) and periods of non-alignment (when data transfer is not possible). Thus the angular extent is set such that the capacity for data transfer between the transceiver devices is sufficient to meet operational requirements.

The inductive coupling elements 32, 33 can be, for example, "C" section magnetic cores e.g. made of ferrite material with wound coils allowing high frequency magnetic fields to be generated and sensed. Alternative forms for the coupling elements include E section magnetic materials, additional rod section magnetic materials and air cored coils.

Figure 3:
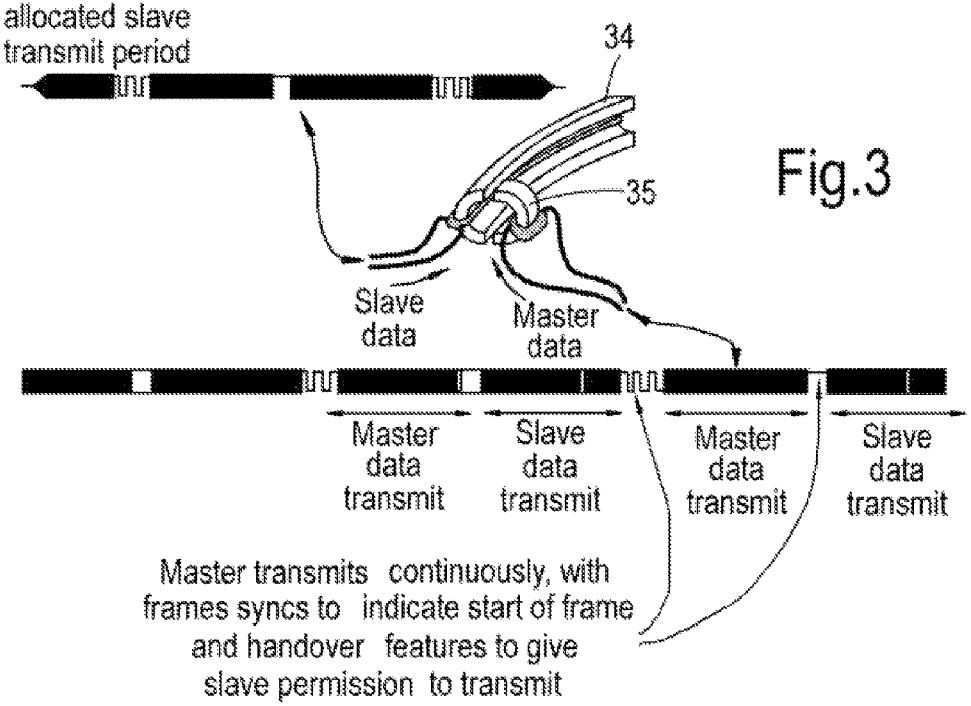
FIG. 3 shows schematically two "C" section core, inductive coupling elements of the transmission system of FIG. 2, and a protocol to allow bi-directional data transfer across the rotating interface.

FIG. 3 shows schematically two such "C" section cores, and a possible protocol to allow bi-directional data transfer across the rotating interface. According to the protocol the second transceiver device 35 is designated the "master" and the first transceiver device 34 is designated the "slave", although the opposite designations could also be applied. The master drives its inductive coupling element 33 with a continuous signalling sequence comprising an encoded data stream which includes the master's call sign, data for transmission to the slave, and a timing signal indicating when the slave may transmit its data. During the slave transmit period the master does not drive its inductive device, but instead it listens until the end of the slave data transmission.

Thus, the slave continuously monitors its coupling element 32 for incoming data. At some point during a revolution, the slave device begins to receive a signal from the master as the coupling elements become aligned. When the slave recognises the valid master call sign, it receives and decodes the data transmitted to it by the master. Thereafter, the slave drives data through its coupling element 32 towards the master in conformity with the timing signal received from the master. The sequence then repeats during subsequent revolutions.

The protocol used to transfer data can also include data encoding at the electrical signal level and higher level protocols for detecting data corruption and enabling bi-directional data exchange. Electrical signal data encoding can utilise phase encoding methods such as Manchester coding. Alternatively, encoding can utilise a modulated carrier signal such as in frequency shift keying or broadband modulation. Error detection protocols can include the use of cyclic redundancy checks, parity checks embedded with the data, and long unique call signs to prevent erroneous bit sequences or erroneous data sources being incorrectly used.

FIG. 4 shows a similar arrangement to that shown in FIG. 2, features common to both FIGS. 2 and 4 having the same reference numbers. However in the arrangement of FIG. 4, a third component 40 contra-rotates relative to the second component 31. In the context of the engine 10 of FIG. 1, the third component could be the aft blade array 26.

The arrangement includes a second transmission system for transmitting data across the rotating interface between the second 31 and third 40 components. The second system has a third inductive coupling element 42 mounted to the second component and a fourth inductive coupling element 43 mounted to the third component. The second system also includes a third transceiver device 44 mounted to the third component and connected to the fourth inductive coupling element. The second transceiver device 35 mounted to the second component forms a part of the second system and is connected to the fourth inductive coupling element.

The second system operates in the same way as the first system. Advantageously, the second transceiver device 35 forms a part of both the first and the second systems. In this way, data can be passed between the first component 30 and the third component 40 via the second component 31. For example, data from the first transceiver 34 are first passed to the second transceiver 35 when the coupling elements 32, 33 align. The second transceiver then stores the data until the coupling elements 42, 43 align, at which point the data are transferred to the third transceiver 44.

As illustrated in the arrangement of FIG. 4, additional inductive coupling elements 42', 43' can be installed across a rotating interface, in this case across the rotating interface between the second 31 and the third 40 components. The additional coupling elements are electrically connected to the corresponding transceivers 35, 44. The additional coupling elements provide a second channel for data exchange on the same revolution, leading to an increased data transfer rate. They also provide redundancy in that data transfer can be maintained in the presence of a fault in any of the coupling elements.

Redundancy may further be enhanced by duplication of the transceivers.

When the original 42, 43 and the additional 42', 43' coupling elements are mounted at the same radial distance from the axis of rotation, once per revolution an original (i.e. channel 1) coupling element becomes aligned with an additional (i.e. channel 2) coupling element. In this case a protocol can be adopted to allow cross-channel data exchange to occur. Alternatively, by the use of appropriate call signs in the transmitted data, data can be prevented from being exchanged between different channels.

Preferably, the original 42, 43 and the additional 42', 43' coupling elements are mounted on diametrically opposed portions of the second 31 and third 40 components to improve their rotational balance. For the same reason, if further additional coupling elements (providing further channels) are provided, then the coupling elements can be equally circumferentially spaced around the components.

The transmission systems discussed above allow data communication between electronics units mounted on engine components that are rotating relative to each other, for example between propeller hub and engine casing, or between the two rotors of a contra-rotating propulsion engine. The intermittent nature of the communications channel allows implementation with practical and maintainable small-sized coupling elements even for large diameter rotating engine components.

Although a propeller gas turbine engine application for the transmission system is described above, other possible rotating machinery applications include generators, ship propulsion pods, wind turbines, and tunnel boring machines.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A system for transmitting data between a first component (30) and a second component (31) which rotates relative to the first component, the system comprising:
   a first coupling element (32) of limited angular extent mounted to the first component, and a second coupling element (33) of limited angular extent mounted to the second component, the first and second coupling elements coming into angular alignment once per revolution of the second component relative to the first component, and
   a first transceiver (34) connected to the first coupling element, and a second transceiver (35) connected to the second coupling element, wherein at least one of the first and second transceivers is configured to detect the angular alignment of the first and second coupling elements, and are further configured to transmit data between the first and second transceivers via the first and second coupling elements when the angular alignment is detected; and
   wherein one of the transceivers is a master transceiver and the other is a slave transceiver, the master transceiver repeatedly driving its respective coupling element with a call signal, and the slave transceiver monitoring its respective coupling element for receipt of the call signal, whereby data is transmitted between the transceivers after the slave transceiver receives the call signal.

2. A system according to claim 1, wherein the first and second coupling elements are inductive elements which magnetically couple with each other when angularly aligned.

3. A system according to claim 1, wherein the first and second transceivers are electrically connected to respectively the first and second coupling elements.

4. A system according to claim 1, wherein the first and second transceivers comprise respective memory elements for temporary storage of data pending transmission of the data from one transceiver to the other via the coupling elements when the angular alignment is detected.

5. A system according to claim 1, wherein the master transceiver drives its respective coupling element after each repeat of the call signal with master data, whereby, after the slave transceiver receives the call signal, the slave transceiver receives the master data.

6. A system according to claim 1, wherein the master transceiver drives its respective coupling element after each repeat of the call signal with a timing signal indicating when the slave transceiver can transmit data to the master transceiver, whereby the slave transceiver drives its respective coupling element with slave data at the time indicated by the timing signal, and the slave data is received by the master transceiver.

7. A system according to claim 1 which further comprises:
   one or more additional first coupling elements of limited angular extent mounted to the first component, and respective additional second coupling elements of limited angular extent mounted to the second component, each pair of an additional first angular element and a corresponding second additional angular element coming into angular alignment once per revolution of the second component relative to the first component,
   wherein the first transceiver is also connected to the additional first coupling elements, and the second transceiver is also connected to the additional second coupling elements, wherein at least one of the first and second transceivers is configured to detect the respective angular alignments of the pairs of first and second additional coupling elements, and are further configured to transmit data between the first and second transceivers via the first and second additional coupling elements when the angular alignments are detected.

8. A system according to claim 1 which is also for transmitting data between the second component and a third component (40) which rotates relative to the second component, the system further comprising:
   a third coupling element (43) of limited angular extent mounted to the third component, and a fourth coupling element (42) of limited angular extent mounted to the second component, the third and fourth angular elements coming into angular alignment once per revolution of the third component relative to the second component, and
   a third transceiver (44) connected to the third coupling element, wherein the second transceiver is also connected to the fourth coupling element, and the third and second transceivers are configured to detect the angular alignment of the third and fourth coupling elements, and the third and second transceivers are further configured to transmit data between the third and second transceivers via the third and fourth coupling elements when the angular alignment of the third and fourth coupling elements is detected.

9. A rotating machine having a first component and a second component which rotates relative to the first component, the machine further comprising a system according to claim 1 for transmitting data between the first component and the second component.

10. A rotating machine having a first component, a second component which rotates relative to the first component, and a third component which rotates relative to the second component, the machine further comprising a first system according to claim 8 for transmitting data between the first component and the second component, and for transmitting data between the second component and the third component.

11. A rotating machine according to claim 9 wherein the rotating machine comprises a gas turbine engine.

12. A rotating machine according to claim 10 wherein the rotating machine comprises a gas turbine engine.

* * * * *